(12) United States Patent
Zeidan (10) Patent No.: US 12,090,820 B2
(45) Date of Patent: Sep. 17, 2024

(54) VEHICLE AUTOMATIC WINDOW SUNSCREENS

(71) Applicant: Numan Zeidan, Hillsborough, CA (US)

(72) Inventor: Numan Zeidan, Hillsborough, CA (US)

( * ) Notice: Subject to any disclaimer, the term of this patent is extended or adjusted under 35 U.S.C. 154(b) by 89 days.

(21) Appl. No.: 17/737,972

(22) Filed: May 5, 2022

(65) Prior Publication Data

US 2022/0258575 A1 Aug. 18, 2022

Related U.S. Application Data

(62) Division of application No. 16/006,800, filed on Jun. 12, 2018, now abandoned.

(60) Provisional application No. 62/518,983, filed on Jun. 13, 2017.

(51) Int. Cl.
*B60J 1/20* (2006.01)
*B60J 3/04* (2006.01)

(52) U.S. Cl.
CPC ........... *B60J 1/2041* (2013.01); *B60J 1/2016* (2013.01); *B60J 1/2019* (2013.01); *B60J 1/2066* (2013.01); *B60J 1/2069* (2013.01); *B60J 3/04* (2013.01)

(58) Field of Classification Search
CPC ...... B60J 1/2086; B60J 1/2011; B60J 1/2019; B60J 1/2016; B60J 1/2041; B60J 1/2063; B60J 1/2077; B60J 3/0204; B60J 3/0213
See application file for complete search history.

(56) References Cited

U.S. PATENT DOCUMENTS

| | | | | |
|---|---|---|---|---|
| 4,804,140 A * | 2/1989 | Cantrell | ............. | B60H 1/00428 136/291 |
| 5,076,633 A * | 12/1991 | Hsu | ........................ | B60J 3/0204 160/310 |
| 5,350,212 A * | 9/1994 | Corn | ...................... | B60J 3/0208 296/97.4 |
| 5,833,299 A * | 11/1998 | Corn | ...................... | B60J 3/0208 296/97.11 |
| 6,811,201 B2 * | 11/2004 | Naik | ...................... | B60J 3/0204 296/97.4 |
| 10,994,590 B2 * | 5/2021 | Kister | .................... | B60J 3/0213 |
| 11,718,158 B2 * | 8/2023 | Hensen | .................. | B60J 3/0252 701/301 |
| 2004/0065101 A1 * | 4/2004 | Krupp | .................... | B60J 1/2019 62/3.3 |
| 2006/0082192 A1 * | 4/2006 | Dubay | .................. | B60J 7/0015 296/214 |
| 2006/0202501 A1 * | 9/2006 | Tadakamalla | .......... | B60J 1/2016 296/97.8 |
| 2016/0129765 A1 * | 5/2016 | Taad | ...................... | B60J 1/2063 160/311 |
| 2017/0136854 A1 * | 5/2017 | Dunne | .................... | B60J 1/2088 |
| 2017/0145739 A1 * | 5/2017 | Choi | ...................... | B60J 1/2077 |
| 2020/0398648 A1 * | 12/2020 | Dernotte | ............ | B60H 1/00814 |

* cited by examiner

*Primary Examiner* — Abe Massad
(74) *Attorney, Agent, or Firm* — William C. Milks, III (57) ABSTRACT

Vehicle automatic window sunscreens are provided, which may comprise a plurality of roller shades for the windows of a vehicle. Sunscreens are installed for the side windows of the vehicle in addition to the windshield and rear window. The sunscreens block or filter radiant energy to reduce the effects of sunlight and heat on occupants and interior components of, and personal property in, the vehicle. The sunscreens protect infants and children if they are forgotten and left in the vehicle during sunny, hot days.

18 Claims, 10 Drawing Sheets

VEHICLE AUTOMATIC WINDOW SUNSCREENS

CROSS-REFERENCE TO RELATED PATENT APPLICATIONS

This application is a division of U.S. patent application Ser. No. 16/006,800 filed on Jun. 12, 2018 which claims the benefit of U.S. Provisional Patent Application No. 62/518,983 filed on Jun. 13, 2017, entitled AUTOMOBILE/CAR AUTOMATIC SHADES, the disclosure of which is hereby incorporated herein in its entirety by this reference.

BACKGROUND OF THE INVENTION

1. Field of the Invention

The present invention relates to accessories for vehicles and, more particularly, to sunscreens for automobiles, trucks, and other vehicles having windows such as buses, railway cars, aircraft, watercraft, and the like. Specifically, various example embodiments in accordance with the present invention provide vehicle window sunscreens deployed to intercept sunlight to shield occupants in vehicles to protect them as well as the interior components of, and personal property in, the vehicle from the harmful effects of sunlight and the heat produced by the infrared rays of the sun.

2. Description of the Prior Art

The news occasionally reports the serious threat to life and even death of infants and children, as well as pets, from being forgotten in a vehicle, and left inside for a prolonged period of time during sunny and hot weather, with temperatures soaring to more than one hundred degrees, with the windows closed or partially open, suffering from intense heat and dehydration, due to the heat produced by the sun. It would be desirable to provide an apparatus that shields occupants of vehicles from the deleterious effects of sunshine and heat, thereby protecting vulnerable persons such as infants and children, as well as pets, if they are forgotten and left inside a vehicle, by blocking or filtering the radiated light and heat of the sun to save lives.

Conventional vehicle window shades are typically manufactured separately and installed manually, some for the windshield, some for rear side windows, and some for the back window of a vehicle such as an automobile. Consumers are often not satisfied, because the vehicle window shades are not the correct size to fit precisely. Shopping for vehicle window shades is difficult, because the sizes of vehicle windows differ. Some vehicle window shades require a consumer to call the manufacturer for custom made shades for a specific vehicle windshield or window size to obtain the correct size for the particular vehicle year make and model.

Some conventional vehicle window shades are the folding, accordion type, some employ suction cups, and some rely on static cling after cleaning the windows to remove dust and debris so that the shades adhere to the windows, and some are retractable and constructed of thick plastic and are heavy and bulky and are used mainly for the back window of the vehicle. Other conventional vehicle window shades are constructed from standard materials for shades, and they utilize Velcro fasteners, aggressive bonding, or adhesive mounting pieces to stick on the side of the windshield to attach the shades. Some vehicle window shades are called automatic retractor shades, but they are manually opened and closed with a strap by pulling to the left and to the right, and employ the vehicle sun visors for support, and by pulling or rolling up with a Velcro tie to hold the shades in a closed condition when not in use. Some conventional vehicle window shades are constructed from polyester film laminated to a thin layer of closed-cell foam, with a polyester film back, then sewn around the edges with cloth binding plus a Velcro or elastic strap to hold the shades in a closed condition to facilitate storage. In most instances, conventional vehicle window shades involve much difficulty and wasted time and effort to put up and take down the shades.

Thus, known vehicle window shades have many disadvantages. They are difficult for consumers to put up and take down. Some vehicle window shades employ undependable suction cups, or require the shades to be braced up with sun visors. Drivers sometimes employ the front passenger seat tilted forward to support a windshield folding shade. They become wrinkled, and some are the folding type and become dislodged easily. Some come in travel pouches and have to unpacked to install them and packed again after use. Some have wire frames which become bent with use. Others stick together, and some employ static cling, requiring the use of a cloth to clean the windows to remove dust and debris and pressing all the way around the shades so they stick to the window. The folding type of vehicle window shades has to be unfolded every time they are used and refolded after use for storage in the vehicle. Drivers have to utilize adjustable clip attachments to install some vehicle window shades, and it is difficult to affix the clips firmly to the windows of the vehicle. Some vehicle window shades employ a push button for easy rollup, but still involve manually installing the shades with suction cups or other attachments, requiring time and effort to put them up and take them down.

SUMMARY OF THE INVENTION

In accordance with example embodiments of the present invention, vehicle automatic window sunscreens are provided. In accordance with the present invention, one example embodiment comprises roller shades for the windows of a vehicle. In accordance with various other example embodiments of the present invention, sunscreens are provided for the windows of the vehicle to automatically filter radiant energy to reduce the deleterious effects of sunlight and heat on occupants and interior components of, and personal property in, the vehicle.

BRIEF DESCRIPTION OF THE DRAWING

The various example embodiments of the present invention will be described in conjunction with the accompanying figures of the drawing to facilitate an understanding of the present invention. In the drawing.

DETAILED DESCRIPTION OF THE PREFERRED EXAMPLE EMBODIMENTS

Figure 1:
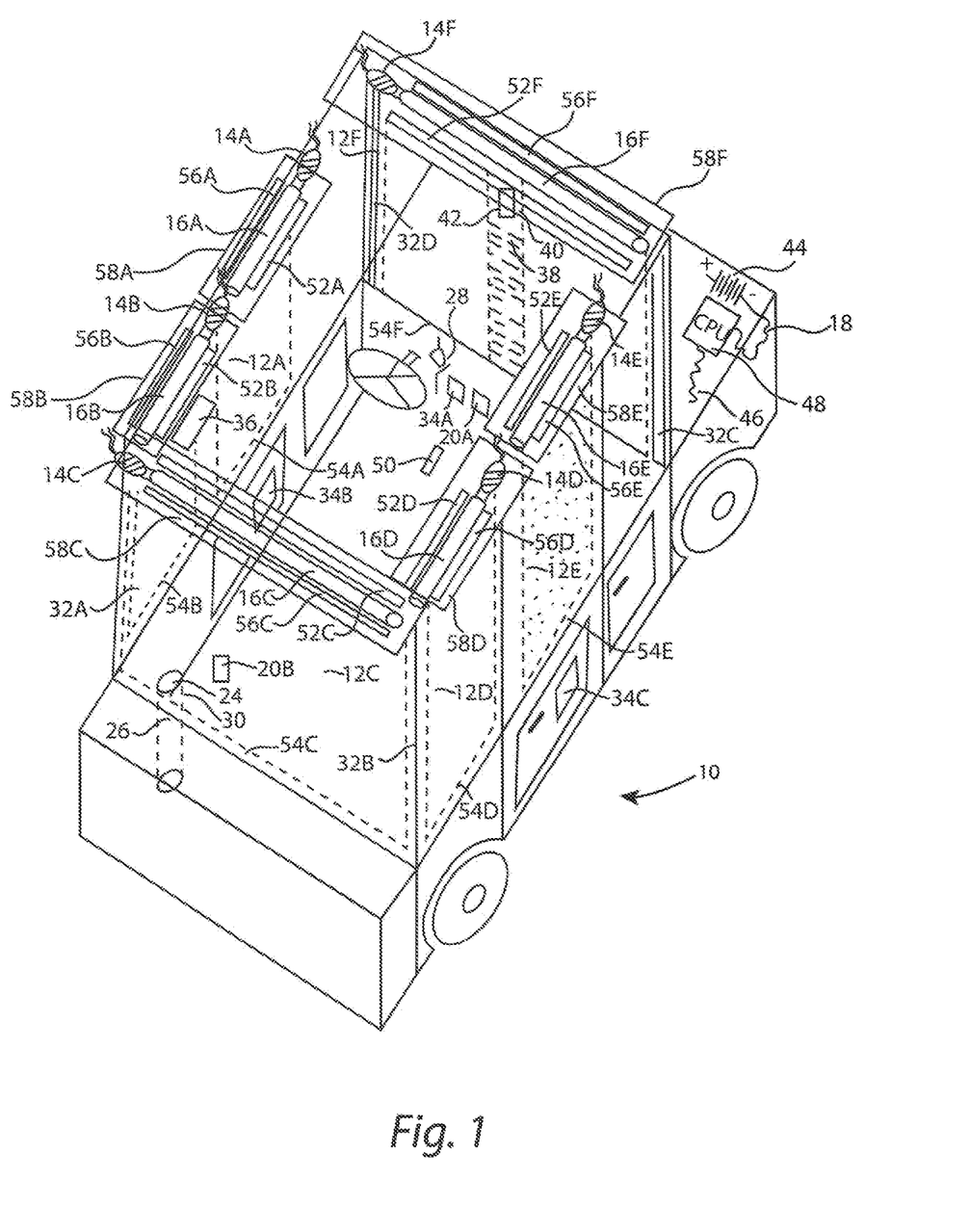
FIG. 1 is a top perspective view illustrating an example embodiment of automatic shades installed in a vehicle in accordance with the present invention.
Figure 2:
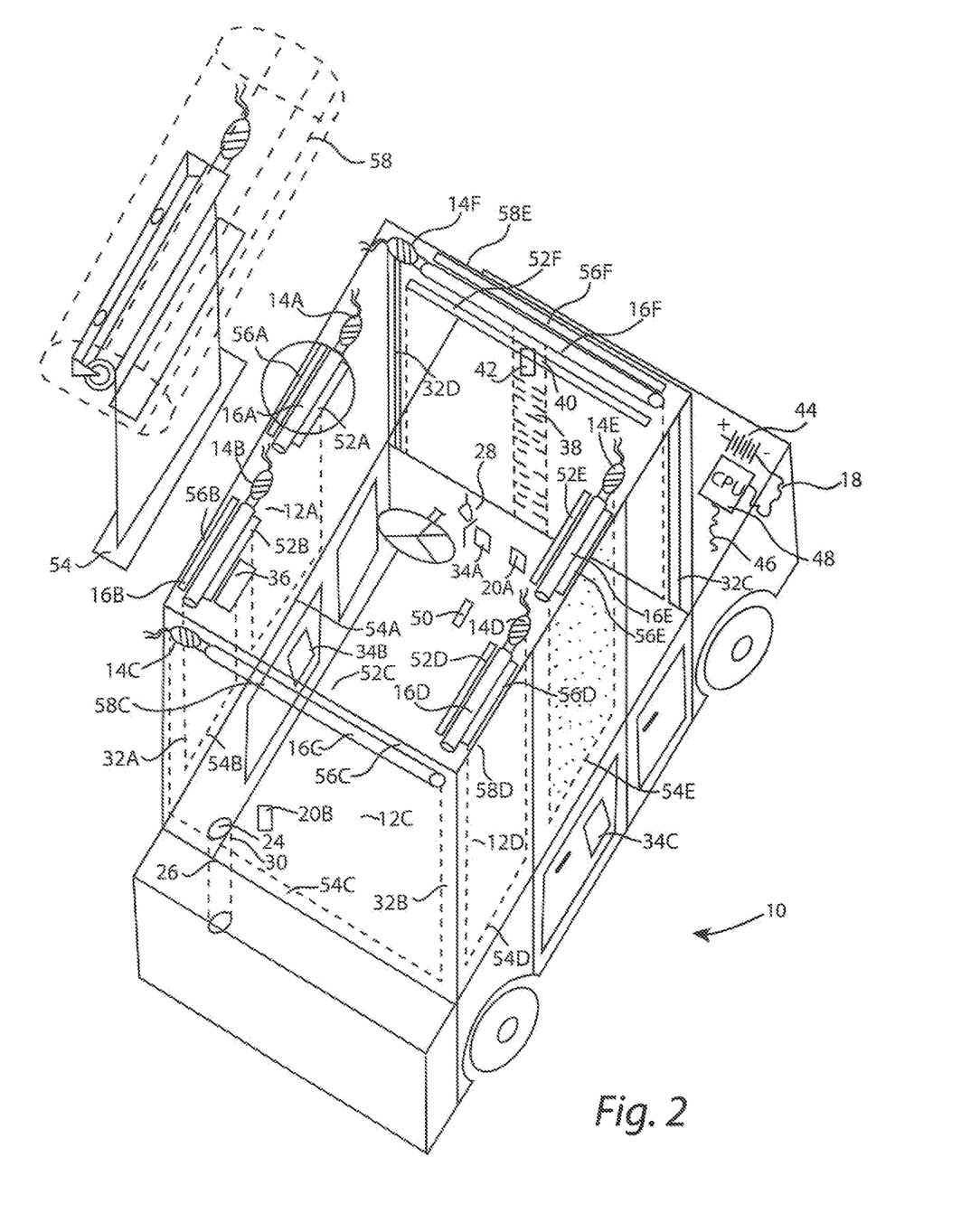
FIG. 2 is top perspective view illustrating an example embodiment of automatic shades installed in a vehicle in accordance with the present invention, including a detail of a roller shade.

As shown in FIGS. 1 and 2, vehicle automatic window sunscreens 10 may comprise a plurality of roller shades 12A, 12B, 12C, 12D, and 12E, a total of three to five depending on how many side windows the vehicle has, including one roller shade for the back window of the vehicle. Also, the windshield may be provided with a roller shade 12F that is split in the middle to accommodate a rear view mirror mount 42 attached to the windshield.

The roller shade 12F for the windshield comprises bristles 38 preferably constructed from the same material as the roller shade with an aperture 40 at the top of the bristles to accommodate the rear view mirror mount 42. The bristles 38 divide the roller shade 12F vertically, perpendicular or oblique to the dashboard of the vehicle. Also, the roller shade 12F is preferably provided with rails 32C and 32I at the right and left edges of the windshield to guide roller shade 12F when lowering and raising roller shade 12F. The rear window may also be provided with left and right rails 32A and 32B installed at the edges of the back window so that the roller shade 12C for the rear window is guided by the rails when lowering and raising roller shade 12C.

In accordance with example embodiments of the present invention, the roller shades 12A, 12B, 12C, 12D, 12E, and 12F may be constructed with safety, light filtering, and decorative fabrics comprising polyester or any other suitable UV resistant material. For example, the roller shades 12A, 12B, 12C, 12D, 12E, and 12F may be white or another color, and constructed from UV resistant material such as Mylar. Alternatively, the back window roller shade 12C may comprise a see-through mesh shade for use while driving without affecting safe driving. Thus, the roller shades 12A, 12B, 12C, 12D, 12E, and 12F have a wide range of options and may be constructed from a wide range of materials, including see-through mesh fabrics, polyester, or any other suitable materials. Also, the surfaces of the roller shades 12A, 12B, 12C, 12D, 12E, and 12F that face the street may be used for advertising or be decorated with art work such as flowers, trees, and mountains.

Alternatively, the roller shades 12A, 12B, 12C, 12D, 12E, and 12F can be constructed with transparent infrared (IR) and ultraviolet (UV) blocking film. In accordance with a preferred example embodiment of the present invention, the roller shades 12A, 12B, 12C, 12D, 12E, and 12F are constructed with 3M "Prestige Series" PR70 infrared (IR) film which may be laminated to an ultraviolet (UV) resistant substrate such as clear or opaque Mylar for added structural integrity. The "Prestige Series" PR70 film manufactured by 3M is a non-metallized, multi-layer optical film that rejects up to 97% of the sun's infrared (IR) wavelength light and rejects up to 60% of the heat transmitted through the windows of the vehicle. The PR70 film also rejects up to 99.9% of damaging ultraviolet (UV) rays to reduce fading of the vehicle interior and personal property in the vehicle.

As shown in FIGS. 1 and 2, the roller shades 12A, 12B, 12C, 12D, 12E, and 12F are attached to rollers 16A, 16B, 16C, 16D, 16E, and 16F connected to respective electric motors 14A, 14B, 14C, 14D, 14E, and 14F. The motors 14A, 14B, 14C, 14D, 14E, and 14F are connected to a vehicle battery 44 by electrical wires 18 via an adjustable electrical digital thermostat 20A (an automatic device for regulating temperature) which is set to a predetermined temperature, for example, sixty-five to seventy-eight degrees. The thermostat 20A is also preferably connected to an auxiliary air conditioning system 22, to activate the auxiliary air conditioning system when the temperature inside the vehicle exceeds the predetermined thermostat setting. For example, the auxiliary air conditioning system 22 may be a 12V 5A Electronic Semiconductor Refrigerator Radiator Cooling Film Equipment DIY available on eBay. Preferably, the thermostat 20A is set so that the car battery 44 can power the auxiliary air conditioning system for many hours, as well as activate the motors 14A, 14B, 14C, 14D, 14E, and 14F to concurrently lower the roller shades 12A, 12B, 12C, 12D, 12E, and 12F installed to the upper portions of the respective side and rear windows and windshield underneath the ceiling of the vehicle and above the windows and away from passengers.

Figure 3:
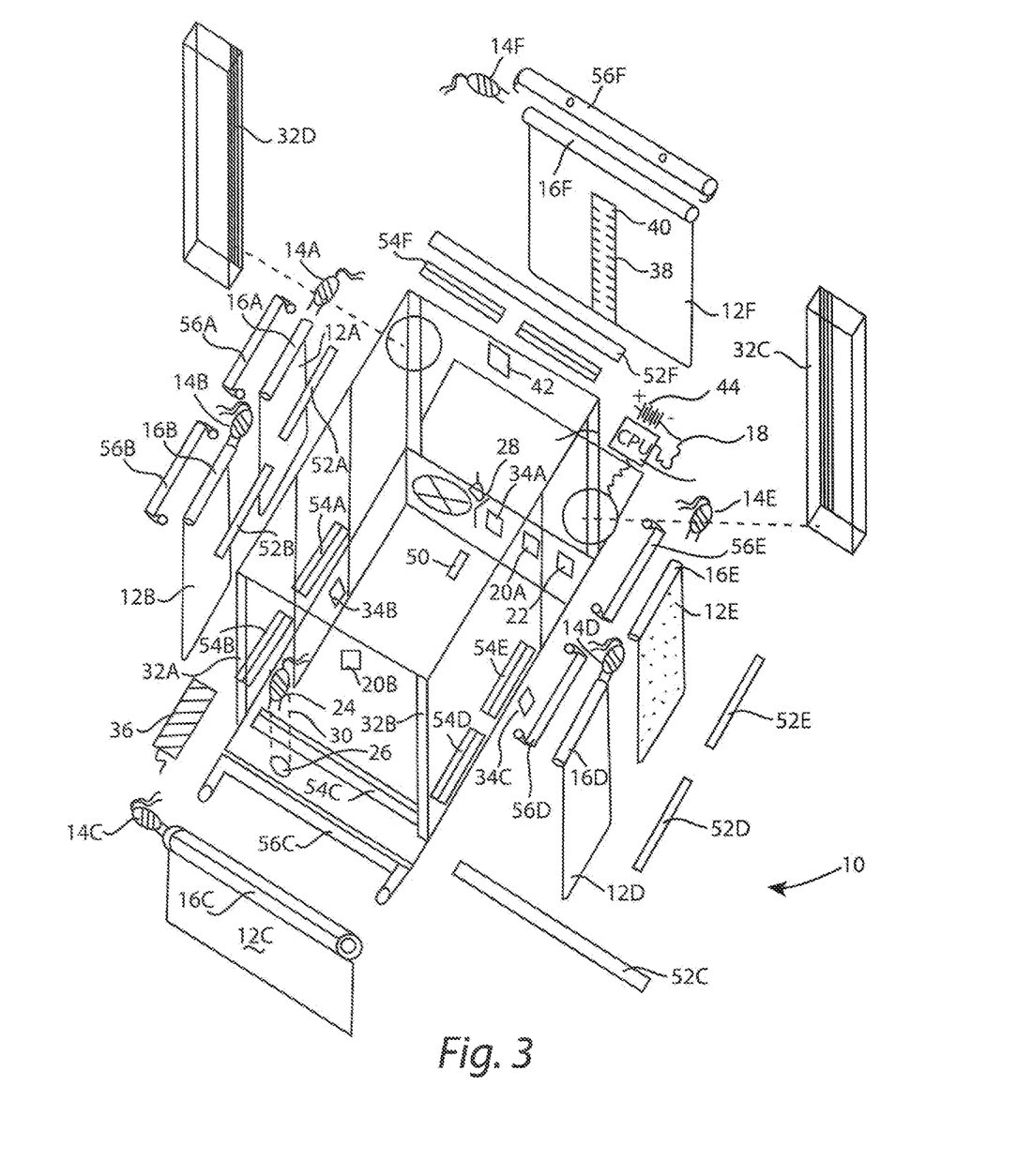
FIG. 3 is an exploded view of the automatic shades shown in FIG. 1.

As shown in FIGS. 1 and 3, the roller shades 12A, 12B, 12C, 12D, 12E, and 12F may be installed in the arched space between the windows and the ceiling of the vehicle. The roller shades 12A, 12B, 12C, 12D, 12E, and 12F, motors 14A, 14B, 14C, 14D, 14E, and 14F, and rollers 16A, 16B, 16C, 16D, 16E, and 16F are mounted in respective housings 58A, 58B, 58C, 58D, 58E, and 58F having elongated openings 52A, 52B, 52C, 52D, 52E, and 52F, respectively, through which the roller shades are extended and retracted. Preferably, the housings 58A, 58B, 58C, 58D, 58E, and 58F are mounted in the arched space below the ceiling and above the windows of the vehicle and have an exterior finish to match the color of the interior of the vehicle.

FIG. 3 shows the elongated openings 52A, 52B, 52C, 52D, 52E, and 52F to accommodate extension and retraction of the roller shades 12A, 12B, 12C, 12D, 12E, and 12F when installed in the arched space between the windows and the ceiling of the vehicle. Slit covers 54A, 54B, 54C, 54D, 54E, and 54F are preferably attached to bottom portion of the roller shades 12A, 12B, 12C, 12D, 12E, and 12F, respectively. As shown in the details in FIG. 3, rails 32C and 32D are provided to guide the slit cover 54F and prevent buckling or bending of the windshield roller shade 12F. The slit cover 54F slides down and up the rails 32C and 32D when the roller shade 12F is extended and retracted, respectively.

The slit covers 54A, 54B, 54C, 54D, 54E, and 54F attached to the bottom portion of the roller shades 12A, 12B, 12C, 12D, 12E, and 12F are a suitable weight to pull the roller shades down by gravitational force. Also, the slit covers 54A, 54B, 54C, 54D, 54E, and 54F conceal the roller shades 12A, 12B, 12C, 12D, 12E, and 12F when they are retracted and aid in keeping the finished look of the interior of the vehicle adjacent to the ceiling of the vehicle. Preferably, the color of the slit covers 54A, 54B, 54C, 54D, 54E, and 54F matches the interior color of the vehicle.

The housings 58A, 58B, 58C, 58D, 58E, and 58F are provided with respective mounting brackets 56A, 56B, 56C, 56D, 56E, and 56F to secure the housings for the roller shades 12A, 12B, 12C, 12D, 12E, and 12F, motors 14A, 14B, 14C, 14D, 14E, and 14F, and rollers 16A, 16B, 16C, 16D, 16E, and 16F to the arched space between the windows and the ceiling of the vehicle.

Figure 4:
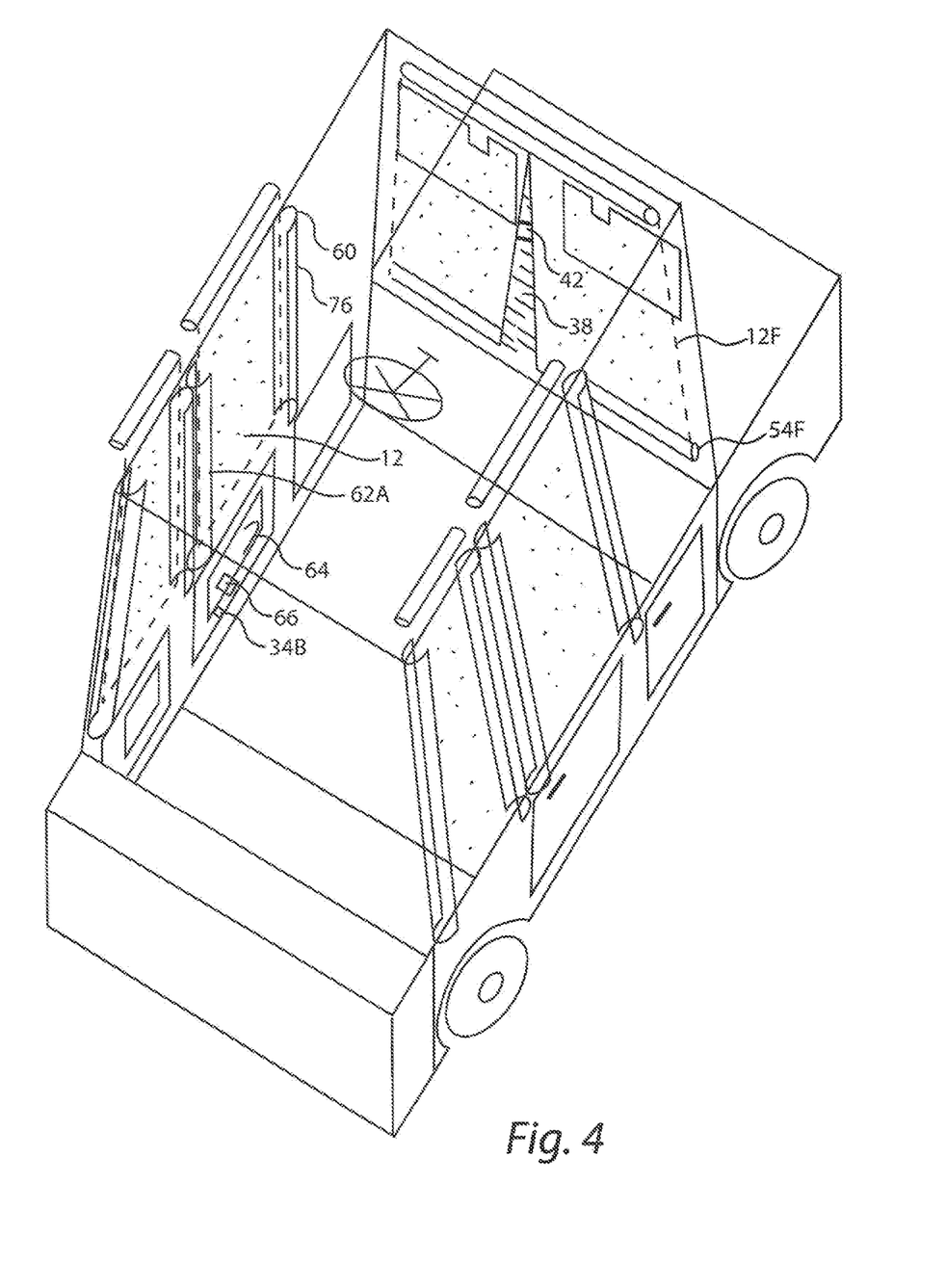
FIG. 4 is a top perspective view showing an example embodiment of automatic shades for the windshield and side windows mounted in the arched spaced between the ceiling and windows of a vehicle.

As shown in FIG. 4, for a precise fit, guides 60 having opposed channels 62A may be attached to the inside door pillars 76 below the ceiling of the vehicle to guide roller shades 12A, 12B, 12D, and 12E with respect to the doors and windows, so that the roller shades are positioned precisely with respect to the windows of the vehicle, because the ceiling of the vehicle is typically curved inwardly and the doors and the windows of the vehicle are typically curved outwardly. The guides 60 and channels 62A also compensate for the spatial difference between the ceiling and the windows of the vehicle to guide the roller shades 12A, 12B, 12D, and 12E when they are lowered and raised.

Preferably, the roller shades 12A, 12B. 12D, and 12E extend (roll down) only if the doors of the vehicle are closed. Passengers can also preferably extend (roll down) the roller shades 12A, 12B, 12D, and 12E by actuating switches 34B and 34C when they are in the vehicle. If passengers exit the vehicle, they pull on inside door handles 64 that are connected to switches 66 on the door, which are actuated so that if the roller shades 12A, 12B, 12D, and 12E are extended, they retract (roll up) automatically before the vehicle doors open so that the roller shades are not in the way of passengers exiting the vehicle.

Figure 5:
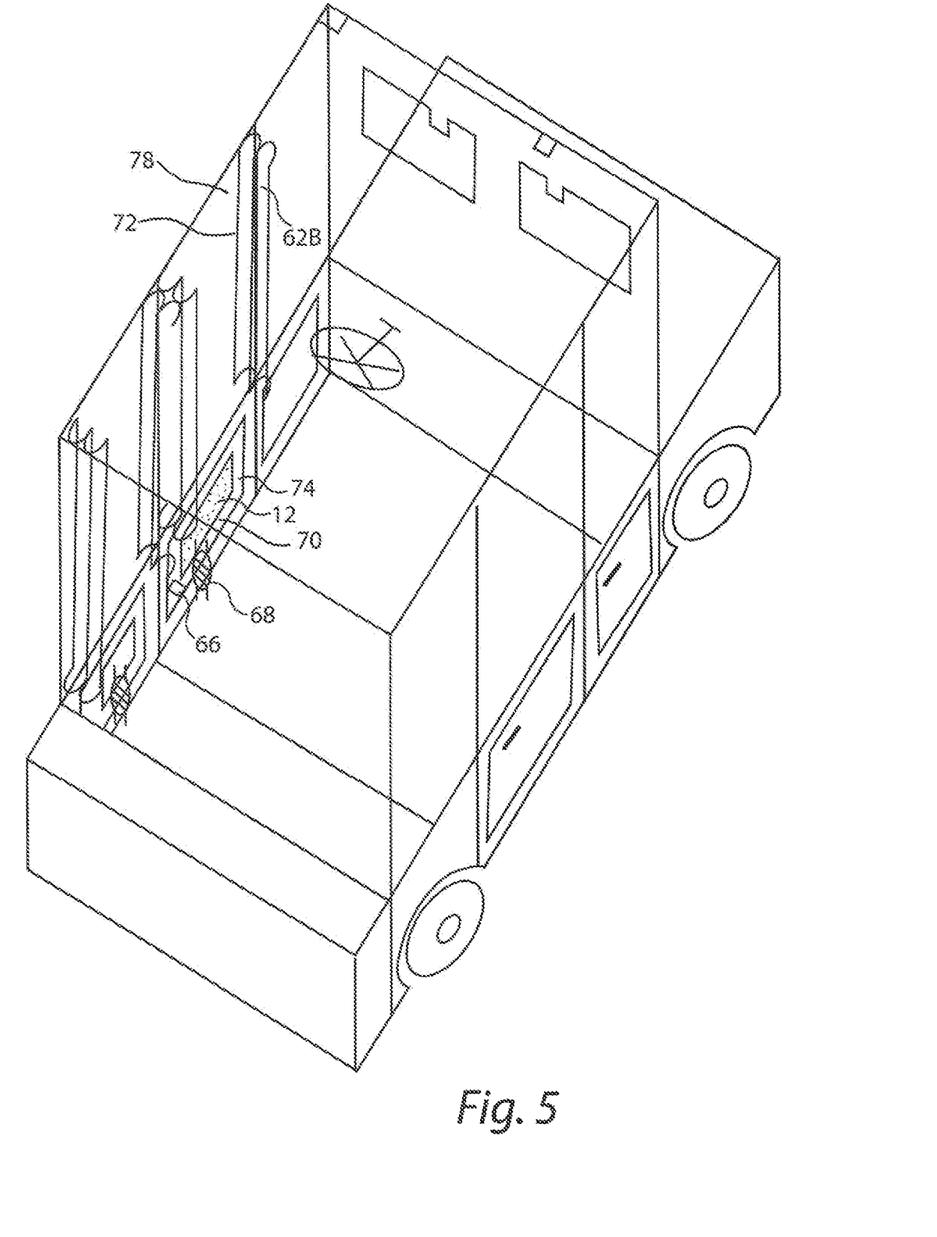
FIG. 5 is a top perspective view showing an example embodiment of automatic shades for the side windows installed inside the door panels of a vehicle.

As shown in FIG. 5, in accordance with another example embodiment, the roller shades 12A, 12B, 12D, and 12E may be installed inside the door panels of the vehicle to assure a precise fit to the vehicle window size. The roller shades 12A, 12B, 12D, and 12E are attached to rollers as shown in FIGS. 1 and 2 connected to electric motors 68 selected according to the weight of the roller shades and attached to rigid frames 70. The electric motors 68 are connected to the vehicle battery 44 via the thermostat 20A. The rigid frames 70 can be constructed from thin metal or plastic or any other materials and are installed inside the door panels 74. The roller shades 12A, 12B, 12D, and 12E slide up and down the channels 62B adjacent to the vehicle window channels 72 which guide the window glass 78. The roller shades 12A, 12B, 12D, and 12E, move up and down similar to power vehicle windows, with the roller shades interior of the windows.

The roller shades 12A, 12B, 12D, and 12E housed inside the door panels 74 are concealed in the door panels, and are preferably provided with separate switches and buttons inside the vehicle. The roller shades 12A, 12B, 12D, and 12E may be connected to vehicle door switches and buttons 66 to provide power shades, with express up and down, retained accessory power, and safety reverse, and to the electrical and computer systems 44 and 46 of the vehicle similar to power vehicle windows.

Referring again to FIGS. 1 and 2, in accordance with another example embodiment, an electrical exhaust fan 24 may be provided as a backup. The exhaust fan 24 may be installed inside the vehicle in the back and lower left or right side of the vehicle and connected to the vehicle battery 44 by a second electrical digital thermostat 20B. The thermostat 20B is preferably set to seventy-nine to eighty-five degrees to activate the exhaust fan 24 to blow hot air out through a vent duct 26 directed underneath the vehicle. The exhaust fan 24 may have a flap cover 30 that opens when the exhaust fan is activated and closes when the exhaust fan is deactivated.

In accordance with yet another example embodiment, a solar panel 36 connected to the vehicle battery 44 by electrical wires 18 may be provided as backup to charge the vehicle battery and to power the auxiliary air conditioning system 22 and exhaust fan 24. The solar panel 36 charges the vehicle battery 44 in the event that the auxiliary air conditioning system 22 and exhaust fan 24 deplete the vehicle battery of power. The solar panel 36 may be installed, for example, on the roof of the vehicle as shown in FIG. 2.

The roller shades 12A, 12B, 12C, 12D, 12E, and 12F are automatically actuated when the vehicle is in the park (P) position by a switch 50 to connect the thermostat 20A to the vehicle battery 44. The vehicle may be equipped with an on/off switch 28 in series with the thermostat 20A, so that when the vehicle is not being driven and the driver is sure that passengers such as children have exited the vehicle, the switch 28 may be set to the off position to override automatic operation of the roller shades 12A, 12B, 12C, 12D, 12E, and 12F. The driver may actuate the switch 28 to the on position to reactivate automatic operation of the roller shades 12A, 12B, 12C, 12D, 12E, and 12F, or the automatic operation of the roller shades may be reactivated automatically when starting the vehicle and the key is in the ignition to arm the roller shades after the vehicle is taken out of the park (P) position so that the roller shades 12A, 12B, 12C, 12D, 12E, and 12F will be automatically activated when the vehicle is subsequently again in the park (P) position. Also, the vehicle may be equipped with switches/buttons 34A for the driver to manually control the roller shades 12A, 12B, 12D, and 12E in the vehicle with the designated window number. This obviates the driver from spending the time and effort of putting up and taking down manually installed vehicle window shades. Furthermore, switches 34B and 34C may be provided for passengers on right rear door and on the left rear door so passengers have the ability to lower and raise the roller shades 12B and 12C to shield the passengers from sunlight and heat.

Another use is that drivers become tired from driving and may desire to take naps in their vehicles. The roller shades 12A, 12B, 12C, 12D, 12E, and 12F enable drivers to be comfortable by blocking sunlight and heat to provide cooler air inside the vehicle while they nap.

The roller shades 12A, 12B, 12C, 120, 12E, and 12F may be easily preassembled and customized to any size vehicle window for precise fit and installed by the manufacturer at the vehicle factory. Alternatively, the roller shades 12A, 12B. 12C, 12D, 12E, and 12F may be installed by installers of aftermarket accessories.

FIG. 3 shows an exploded view of the roller shades 12A, 12B, 12C, 12D, 12E, and 12F for the side, windshield, and rear windows of a vehicle. The roller shades 12A, 12B, 12C, 12D, 12E, and 12F are attached to rollers 16A, 16B, 16C, 16D, 16E, and 16F which are connected to electric motors 14A, 14B, 14C, 14D, 14E, and 14F with cogs and worm gears.

The electric motors 14A, 14B, 14C, 14D, 14E, and 14F are connected to electrical wires 18 and computer wires 46. The electrical wires 18 are connected via the thermostat 20A, switch 28, and parking (P) position switch 50 to the vehicle battery 44. The electric motors 14A, 14B. 14D, and 14E are also connected by the electrical wires 18 via the switches/buttons 34A to the vehicle battery 44 to enable the driver to manually control the roller shades 12A, 12B. 12D, and 12E in the vehicle. The electric motors 14A, 14B, 14D, and 14E for the roller shades 12A, 12B, 12D, and 12E are also connected by the electrical wires 18 via passengers switches 34B and 34C to the vehicle battery 44 and by the computer wires 46 to the vehicle CPU 48.

As shown in FIG. 3, the auxiliary air conditioning system 22 is connected to the electrical wires 18 via the thermostat 20A, switch 28, and parking (P) position switch 50 to the vehicle battery 44 and by the computer wires 46 to the CPU 48. FIG. 3 also shows the backup exhaust fan 24 with the duct 26 directed to underneath the vehicle and the flap cover 30 to open and close when the backup exhaust fan is activated and deactivated, respectively. The backup exhaust fan 24 is connected by the electrical wires 18 via the thermostat 20B, switch 28, and parking (P) position switch 50 to the vehicle battery 44 and by the computer wires 46 to the CPU 48. FIG. 3 further shows the solar panel 36 installed on the back left side of the vehicle roof connected by the electrical wires 18 to the vehicle battery 44 to charge the vehicle battery.

FIG. 3 also shows the bristles 38 in the center of the windshield roller shade 12F and the aperture 40 at the top of the bristles, as well as the rear view mirror mount 42. FIG. 3 further shows rails 32A and 32B for the rear window and rails 32C and 32D for the windshield to guide the respective roller shades 12C and 12F down and up. Preferably, the windshield roller shade 12F has a thin rigid frame as does the rear window roller shade 12C. The rigid frames are constructed from a light metal or any other suitable material and enable the roller shades 12C and 12F to slide up and down to lower (roll down) or to raise (roll up).

As shown in FIG. 4, for a precise fit to the windshield, because the width at the top of the windshield adjacent to the ceiling of the vehicle is smaller than the width of at the bottom of the windshield adjacent to the dashboard, the bristles 38 are longer at the bottom portion of the roller shade 12F and shorter at top portion of the roller shade 12F. Also, the slit cover 54F is split in the middle to accommodate the rear view mirror mount 42.

Figure 8:
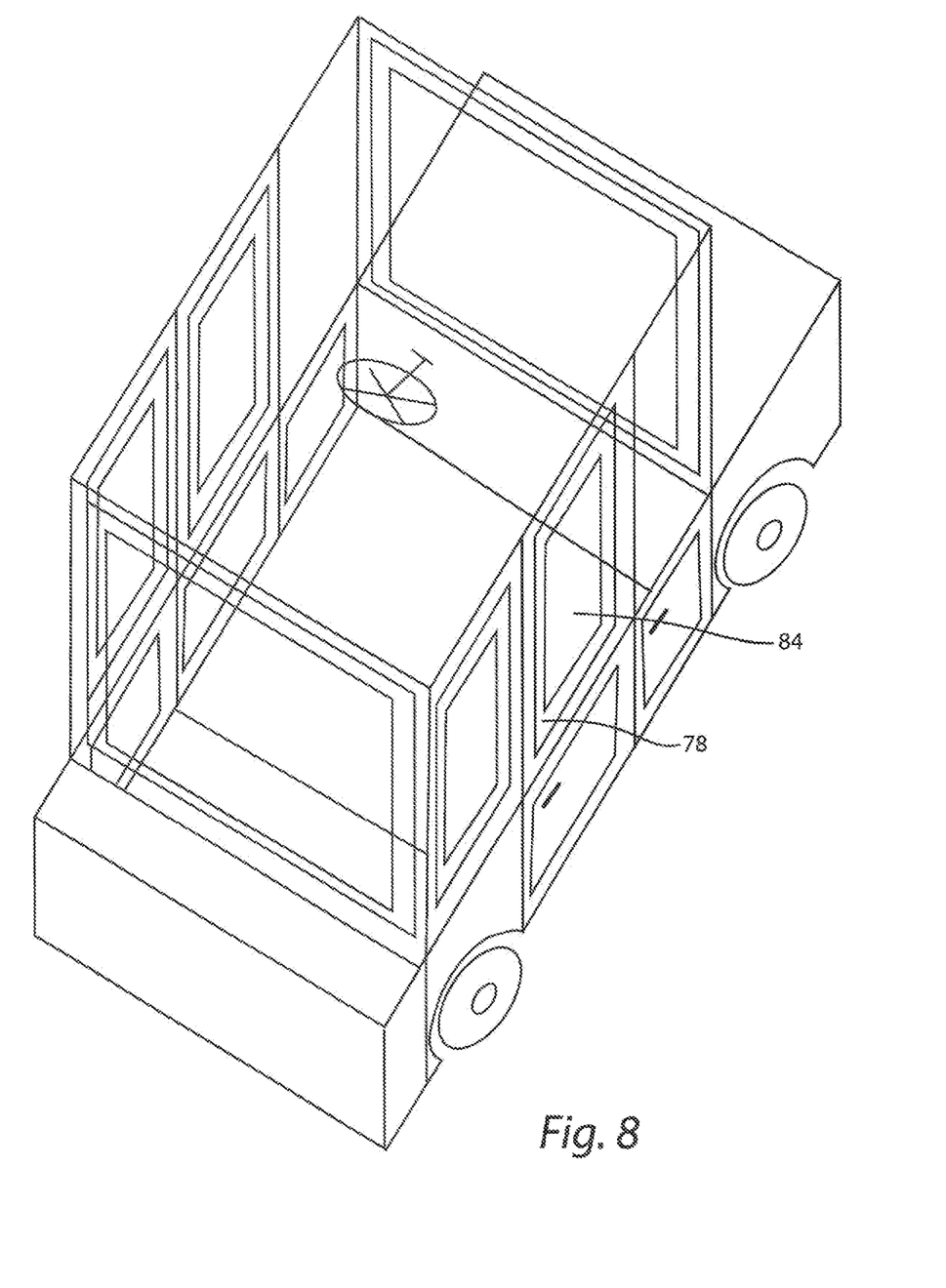
FIG. 8 is a top perspective view showing an example embodiment of transparent sunlight filtering film installed on the inside of vehicle windows to automatically provide vehicle window sunscreens.

As shown in FIG. 8, in accordance with another example embodiment, in addition to or a substitute for the roller shades 12A, 12B. 12C, 12D, 12E, and 12F, transparent sunlight filtering film may be installed on the inside of the vehicle windows 78 as transparent sunscreen film 84. The sunscreen film 84 can be 3M "Prestige Series" PR70 infrared (IR) film. In accordance with another example embodiment, the transparent sunscreen film 84 can be used as the laminated film in the construction of vehicle safety glass windows to filter IR and UV wavelengths produced by the sun.

Figure 6:
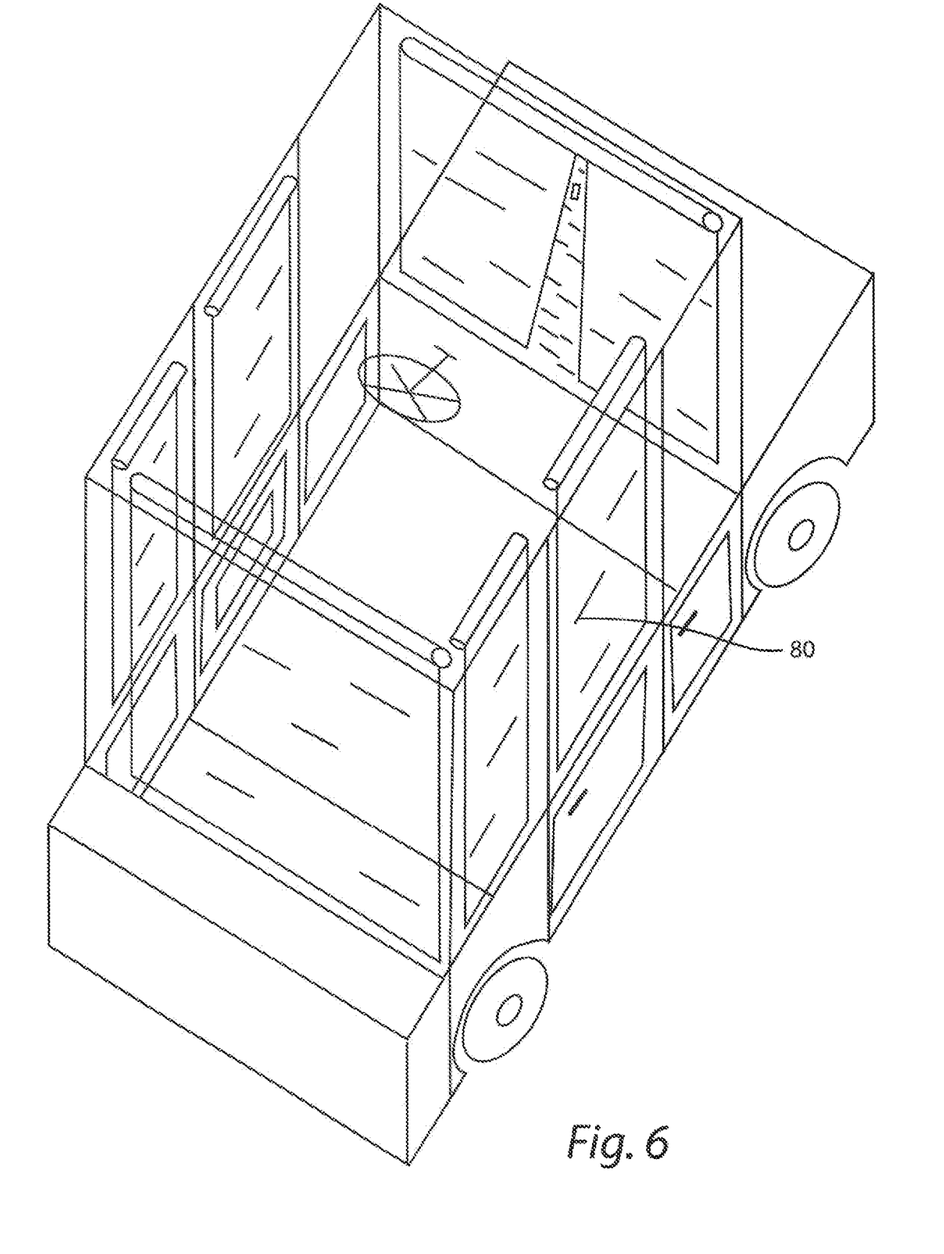
FIG. 6 is a top perspective view showing an example embodiment of automatic shades constructed of thin clear polyester, polycarbonate, or vinyl and further comprising embedded organic photochromic molecules.

UV radiation from the sun reaches the earth as long-wavelength UVA and shortwave UVB rays. Glass effectively blocks UVB, and windshields are specially treated to block UVA as well, but a vehicle's side and rear windows allow UVA to penetrate. Accordingly, as shown in FIG. 6, vehicle automatic sunscreens 80 may be constructed of thin clear polyester, polycarbonate, or vinyl with organic photochromic molecules, for example, oxazines and naphthopyrans, embedded into the surface layer of the plastic in uniform thickness of up to 150 µm, to provide a reversible darkening effect, when exposed to UVA to provide photochromic sunscreens 80.

Figure 7:
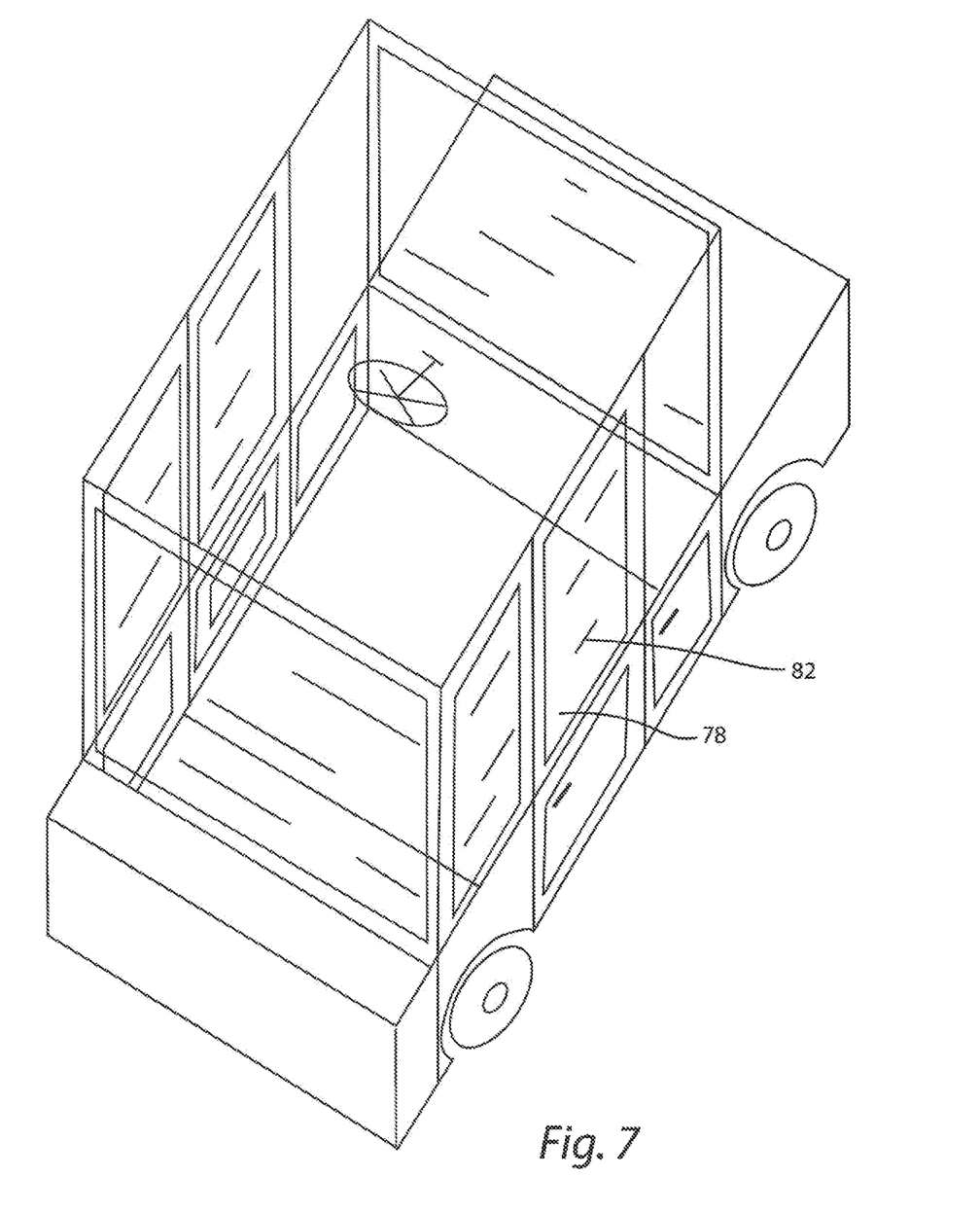
FIG. 7 is a top perspective view showing an example embodiment of the use of photochromic sunscreens to construct safety glass for vehicle windows.

Alternatively, as shown in FIG. 7, vehicle automatic sunscreens 82 may be embedded in vehicle window glass 78 using the plastic photochromic sunscreens 80 to construct the safety glass used in vehicles. Also, molecules of silver chloride or other microcrystalline silver halides may be embedded in the glass substrate or the sandwiched plastic layer comprising safety glass to provide a reversible darkening effect when exposed to ultraviolet (UV) light.

As shown in FIG. 8, in the case of photochromic vehicle automatic sunscreens 80, in order to counteract their dark state caused by cold weather, transparent electrical conductors 86 or 88 may be embedded in the glass 78. For example, indium tin oxide conductors 86, widely used on the windshields of airplanes to defog the windshields, may be employed to heat the glass 78, or transparent ceramic conductors 88, such as alumina $Al_2O_3$ or yttrium aluminum garnet (YAG) or neodymium-doped ND:YAG, a combination of the two materials, has proven to be one of the top performers in the field. The transparent conductors 86 or 88 are used to warm the glass and the photochromic compounds embedded in the glass substrate to counteract darkening. Also, transparent conducting film (TCF) may be utilized, but it is more expensive. Transparent conductors do absorb significant amounts of the mid- to near-IR.

Figure 9:
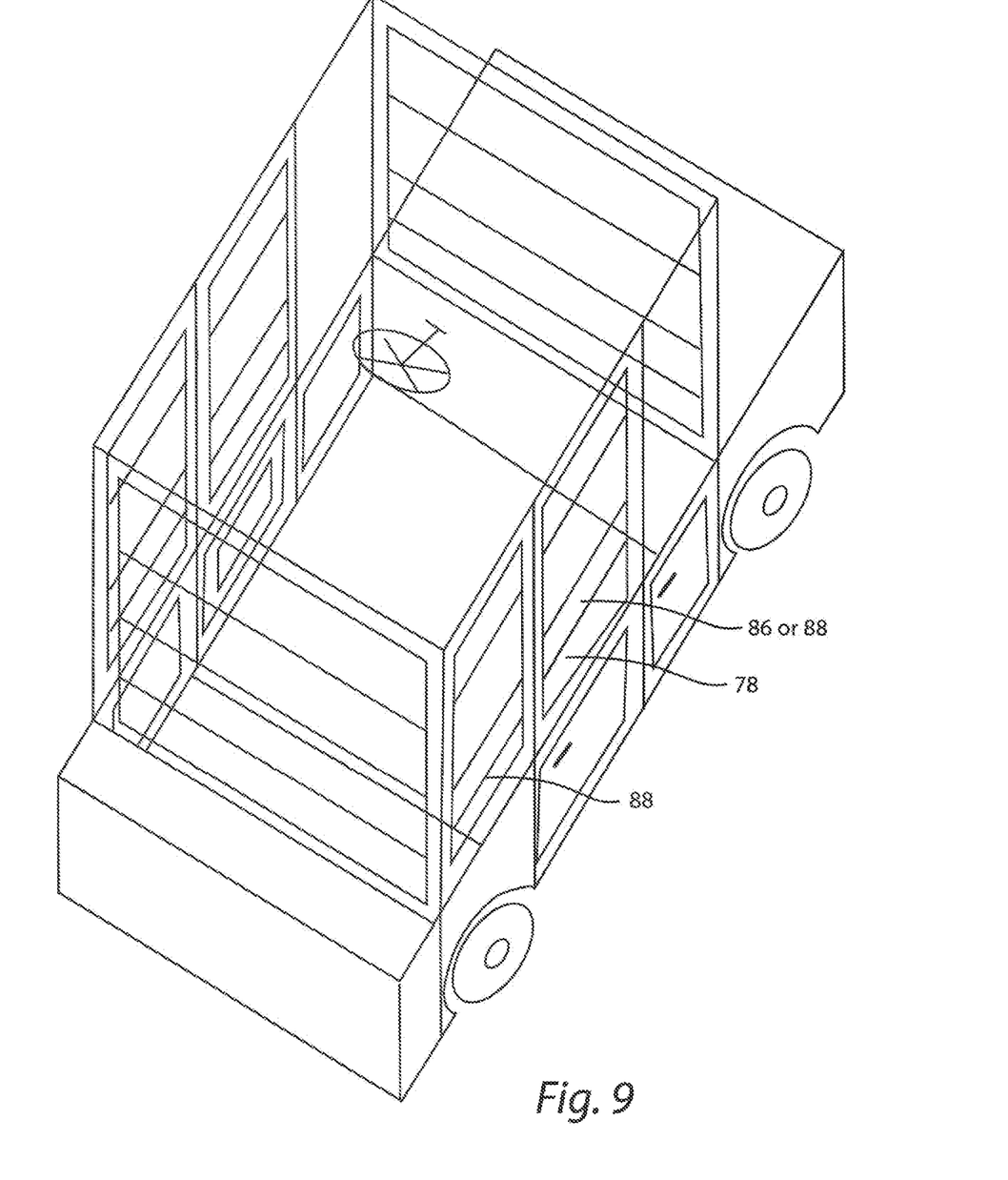
FIG. 9 is a top perspective view showing an example embodiment of transparent conductors to control the darkening of photochromic vehicle window sunscreens.

As shown in FIG. 9, the transparent conductors 86 or 88 are connected via automatic timers and/or digital sensors by the electrical wires 18 to the vehicle battery 44 to control the darkening of the photochromic vehicle automatic sunscreens 80 so that they change from clear to dark or dark to clear automatically.

To counteract temperature dependency during summer, which causes photochromic sunscreens 80 to retain their clear state by thermal process caused by high temperature, the auxiliary air conditioning system 22 can be switched on automatically by an additional thermostat (not shown), so that the photochromic sunscreens 80 will provide the reversible darkening effect.

The examples of vehicle automatic window sunscreens 10 in accordance with the present invention have many advantages. The lives of infants and children, as well as pets, will be saved. Drivers and parents will not have to worry about forgetting infants and children in a vehicle during searing temperatures during summer, because their children will be protected.

Furthermore, the vehicle automatic window sunscreens 10 protect the vehicle interior, as well as personal property in the vehicle, from the sun, because the sunscreens may be installed on all windows including the windshield, and activated if the vehicle is in the park (P) position or otherwise controlled for safety reasons if needed. The vehicle automatic window sunscreens 10 provide comfort to drivers who become tired from driving and desire to take naps inside their vehicles, by protecting them from the sun and the heat. The vehicle automatic window sunscreens 10 may be installed in the space between the windows and ceiling of the vehicle, away from passengers, and they can be connected to the main computer 48 of the vehicle to control them automatically with an electronic key, so that the roller shades 12A, 12B, 12C, 12D, 12E, and 12F will raise (roll up) before driving and lower (roll down) when the vehicle is parked to protect the inside of the vehicle from the sun and heat so the inside of the vehicle remains comfortable, and drivers do not have to air out their vehicles. Also, the roller shades 12A, 12B, 12C, 12D, 12E, and 12F may be connected to the vehicle door switches, so when the driver is ready to drive, the roller shades retract (roll up) automatically when the driver opens the vehicle door. The roller shades 12A, 12B, 12C, 12D, 12E, and 12F are activated only if the vehicle is in the park (P) position, which renders them safe to use without affecting driving. The incorporation of two thermostats, one for the auxiliary air conditioning system 22 and one for the backup exhaust fan 24 enhance reliability and improve safety, because digital devices occasionally malfunction, and, therefore, having a separate backup is an advantage.

The vehicle automatic window sunscreens 10 do not affect safe driving, but improve safety for the following reasons. First, the windshield roller shade 12F and the back window roller shade 12C are automatically deployed only if the vehicle is in the park (P) position. Second, the side rear right window roller shade 12E for the blind-spot window may be constructed with see-through mesh materials, which are widely and safely used while driving and parking a vehicle. Third, with the use of vehicle automatic window sunscreens 10 on most vehicle windows, the driver is more comfortable driving in a cool atmosphere inside and while parking the vehicle during hot outside ambient temperatures, which improves safety. Fourth, when drivers tire of driving, they may take naps in their vehicles, and the vehicle automatic window sunscreens 10 provide them with comfort while they nap before they resume driving when ready and rested, which improves safety greatly. Fifth, parents are happier and more comfortable driving when not disturbed or distracted, because the vehicle is cool and their children are not bothered or crying due to high temperature, which improves safe driving. Sixth, with the aforementioned example embodiments of the present invention operating as a complete and connected system with the aid of the CPU 48 and integrated into the vehicle electrical and computer systems 44 and 46, makes the vehicle automatic window sunscreens 10 very reliable with no distraction to drivers or parents while driving, which improves safe driving. Seventh, drivers occasionally write and draw on vehicle glass windows to exercise their first amendment right, or write, for example, "Just Married", or other writings or drawings, which obstructs the view through the vehicle windows and makes driving difficult and dangerous. Drivers do not need do write or draw on the vehicle windows, because they can use the roller shades 12A, 12B, 12C, 12D, 12E, and 12F to write and draw and express their opinions, and raise (roll up) the rolling shades when ready to drive, which improves safe driving.

Drivers and parents do not need to bother with putting conventional vehicle window shades up or taking them down, folding them or unfolding them, because the vehicle automatic window sunscreens 10 are already installed by the vehicle manufacturer or aftermarket accessory installer. The vehicle automatic window sunscreens 10 may be installed in convertible automobiles by utilizing more rigid roller shades and frames, and they may be installed in the dashboard below the windshield, and in right and left vehicle doors adjacent to the vehicle windows from the inside with the roller shades 12A, 12B, 12C, 12D, 12E, and 12F on the inside and windows on the outside, and they may be installed in the lower portion of the rear window (back board), with the same principle and examples but in reverse (down to up).

Vehicle windows do not need to be cleaned to make the roller shades 12A, 12B, 12C, 12D, 12E, and 12F stick, as in the case of conventional vehicle window shades which rely on static cling or suction cups, because the vehicle automatic window sunscreens 10 are installed in the vehicle. Having switches/buttons 34B and 34C on both sides of the rear side doors for passengers, and main switches buttons 34A integrated with the vehicle control switches and buttons for the driver, enables manual control of the vehicle automatic window sunscreens 10. The vehicle automatic window sunscreens 10 protect and shield the windows from dust and maintain them clean for visibility, and afford comfort to passengers and drivers while they sit in the vehicle or leave the vehicle and come back to it during sunny, hot days by keeping the interior of the vehicle cooler than the outside ambient temperature. The vehicle automatic window sunscreens 10 make driving and parking safer and more comfortable. The vehicle automatic window sunscreens 10 can be also be employed as an advertising or decorative tool on the outside that faces the street, for example, with vehicle manufacturer names and logos or any other advertising, or to display attractive works of art and drawings of mountains, snow, and flowers, for example.

Figure 10:
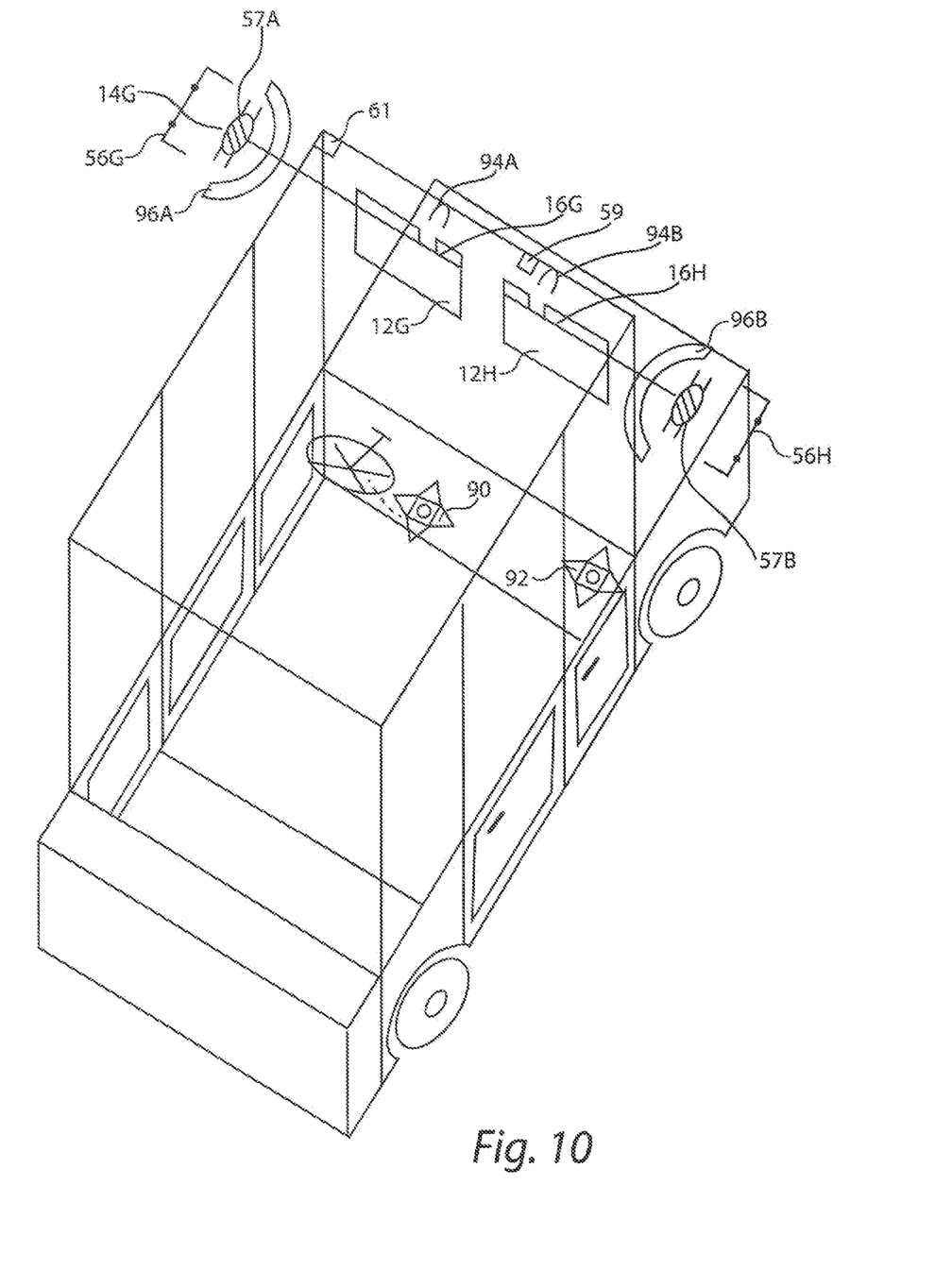
FIG. 10 is a top perspective view showing an example embodiment of powered driver side and passenger side sun visors operated to be lowered and raised and swung away from the windshield toward the driver side and passenger side windows and back to the windshield.

In accordance with another example embodiment of the present invention, as shown in FIG. 10, a driver side sun visor 12G may be operated to be lowered and raised and swung away from the windshield toward the driver side window and back to the windshield manually or automatically with the use of a motor drive mechanism 57A. Preferably, a passenger side sun visor 12H may also be operated to be lowered and raised and swung away from the windshield toward the passenger side window and back to the windshield manually or automatically with the use of an additional motor drive mechanism 57B. The sun visors 12G and 12H may be constructed from pressboard, molded substrates, or polypropylene or they can be constructed from any other materials such as Plexiglas or plastic. The motor drive mechanisms 57A and 57B may be similar to the motor drive mechanism for a power outside rear view mirror, but proportional to the weight and size of the sun visors 12G and 12H. For example, a motor drive mechanism for a power outside rear view mirror is described at https://www.carid.com/articles/what-you-need-to-know-when-ordering-replacement-outside-mirror.html.

The position of the driver sun visor 12G may be adjusted by the driver using a joystick, a four-way knob, or other type of position control. For example, the position of the driver sun visor 12G may be controlled by four directional buttons 90 for pivoting the driver sun visor downward toward the windshield and pivoting the driver sun visor upward to close back to an attachment clip 94A and swinging the driver sun visor left to the driver side window and back toward the windshield with the aid of an arm 16G attached to the driver sun visor 12G and connected to the motor drive mechanism 57A. Preferably, as indicated in FIG. 10, the four directional buttons 90 are integrated with all the steering wheel buttons installed on the steering wheel for the driver to control the position of the driver sun visor 12G.

The position of the front passenger sun visor 12H may likewise be adjusted by the passenger using a joystick, a four-way knob, or other type of position control. For example, the front passenger sun visor 12H may be controlled by four directional buttons 92 for pivoting the front passenger sun visor downward toward the windshield and pivoting the front passenger sun visor upward to close back to an attachment clip 948 and swinging the front passenger sun visor right to the passenger side window and back toward the windshield with the aid of an arm 16H attached to the front passenger sun visor 12H and connected to the motor drive mechanism 57B. Preferably, the four directional buttons 92, having the same functions as the four directional buttons 90, are installed on the passenger side door.

Sun visor attachment clips 94A on the driver side and 94B on the passenger side provide low resistance to the motor drive mechanisms 57A and 57B to facilitate pivoting and swinging of the driver sun visor 12G and front passenger sun visor 12H, respectively. By providing a powered sun visor 12G, the driver does not need to reach to lower, raise, or swing the driver sun visor 12G. Therefore, drivers do not need to remove their hands from the steering wheel and avoid getting distracted and not watching the road and not watching for pedestrians, which can result in accidents. With powered sun visors, drivers can always keep both of their hands on the steering wheel and only use their right or left thumb to position their sun visor, and their eyes can always be on the road, which significantly improves safe driving.

As shown in FIG. 10, the motor drive mechanisms 57A and 57B may be attached inside the vehicle to platforms 56G and 56H mounted to the driver side and passenger side front door pillars, respectively. The motor drive mechanisms 57A and 57B are connected to the respective arms 16G and 16H which rotate and preferably ride on rails 96A and 968, respectively, to replace the L-shaped metal rods that are in use on conventional sun visors to swing left and right and to prevent buckling or bending of the respective sun visors 12G and 12H. The rails 96A and 96B are mounted in front of the motor drive mechanisms 57A and 57B, respectively, and below the arms 16G and 16H to aid in pivoting and swinging the arms and to carry the weight of sun visors, thereby keeping them level.

Preferably, the motor drive mechanisms 57G and 57H are connected to the electrical and computer systems 44 and 46 of the vehicle to lower and raise (rotate downward and upward) the sun visors 12G and 12H and swing them left and right under the control of the four directional buttons 90 and 92, and return them automatically to the attachment clips 94A and 94B when the engine is not running and the vehicle is parked.

In accordance with another example embodiment, a GPS-powered digital compass 59 may be provided to adjust the position of the sun visors 120 and 121H automatically. For example, the GPS-powered digital compass may be a Dakota Digital MCL-GPS17 commercially available from Dakota Digital, Inc. located in Sioux Falls, South Dakota. The GPS-powered digital compass 59 is connected to the motor drive mechanisms 57A and 57B to automatically adjust the position of the sun visors 12G and 12H to the sun position based on the geographical position of the vehicle to enable hands-free operation. The GYPS-powered digital compass 59 may also be connected to the vehicle turn signal switch to anticipate a turn a block before reaching an intersection in response to the left or right turn signal being actuated by the driver of the vehicle to begin to adjust the position of the sun visors 12G and 12H.

In accordance with a further example embodiment, the position of the sun visor 12G to the sun position may be precisely controlled by using a sun sensor and tracker 61 as described, for example, at https://www.azosensors.com/article.aspx?ArticleID=223. The sun sensor and tracker 61 is preferably mounted at the corner of the roof of the vehicle on the driver's side of the vehicle as shown in FIG. 10. The sun sensor and tracker 61 comprises light-sensitive cells which function based on the photoelectric effect. They convert the incoming photons into electrons and hence voltages which are in turn converted into a digital signal. The sun sensor and tracker 61 preferably comprises two sensors placed perpendicular to each other, so that the direction of the sun with reference to the sensor axes can be calculated. The sensors indicate the angle of the sun by continuous discrete signal outputs. The sun visor 12G may be automatically controlled to enable hands-free operation when the sun sensor and tracker 61 is connected to the electrical and computer systems 44 and 46 of the vehicle to control the motor drive mechanism 57A to adjust the position of the sun visor 12G.

The example embodiments in accordance with the present invention described above are provided by way of example only, and various modifications which will be apparent to persons skilled in the art are contemplated. All the example embodiments may be installed on or in public and private transportation vehicles such as airplanes, boats, ships, coaches, buses, trains, and recreational vehicles, with the exception of passenger operated switches, for example, switches 34B and 34C and other passenger operated switches, connected to the electrical and computer systems 44 and 46 to protect passengers from the sun and heat and to keep them safe. Accordingly, the scope of the present invention can only be ascertained with reference to the appended claims.

What is claimed is:

1. A vehicle automatic window sunscreen system in combination with a vehicle, the vehicle including a plurality of side windows, a rear window, and a windshield, the vehicle automatic window sunscreen system comprising:
   a plurality of roller shades each provided for a respective one of the plurality of side windows;
   a plurality of rollers to which the plurality of roller shades are respectively attached;
   a plurality of electric motors respectively connected to each of the rollers, wherein the motors are connected to a vehicle battery by electrical wires via 1) an adjustable thermostat set to a predetermined temperature and 2) a switch in series with the thermostat indicating that the vehicle is parked;
   wherein the roller shades are automatically actuated when the switch indicating that the vehicle is parked is actuated and and a temperature inside the vehicle exceeds the predetermined temperature to connect the electric motors to the vehicle battery to actuate the rollers to extend the roller shades to cover the side windows of the vehicle;
   a rear window sunscreen comprising one of:
   a) a transparent infrared (IR) and ultraviolet (UV) blocking film applied to the rear window;
   b) clear polyester, polycarbonate, or vinyl plastic with organic photochromic molecules embedded into a surface of the plastic in uniform thickness of up to 150 µm or embedded with molecules of silver chloride or other microcrystalline silver halides to achieve a reversible darkening effect when exposed to UVA applied to the rear window; and
   c) one of a) and b) laminated between layers of glass to provide safety glass for the rear window; and
   a driver side sun visor;
   a clip to attach the driver sun visor above the windshield of the vehicle;
   an arm attached to the driver sun visor;
   a first motor drive mechanism mounted to the vehicle and connected to the arm;
   a first visor control comprising at least one of i) a manual control which can be actuated by the driver to adjust a position of the driver sun visor, ii) a GPS-powered digital compass control to adjust the position of the driver sun visor automatically based on the geographical position of the vehicle with respect to the position of the sun, and iii) a sun sensor and tracker control to adjust the position of the driver sun visor automatically with respect to a detected position of the sun;
   wherein the first visor control is connected between the first motor drive mechanism and the vehicle battery to activate the first motor drive mechanism to pivot the driver sun visor downward away from the clip toward the windshield and pivot the driver sun visor downward and upward and swing the driver sun visor to a drive side window of the plurality of side windows and back toward the windshield via the arm attached to the driver sun visor and connected to the motor drive mechanism to adjust the position of the driver sun visor to block the sun.

2. The system of claim 1, further comprising an on/off switch in series with the thermostat and the switch in series with the thermostat indicating that the vehicle is parked, wherein when the vehicle is not being driven, the driver of the vehicle may actuate the on/off switch to an off position to override automatic operation of the roller shades and the driver may subsequently actuate the on/off switch to an on position to reactivate automatic operation of the roller shades.

3. The system of claim 1 wherein the vehicle comprises rear doors wherein each rear door comprises one of the plurality of side windows and a corresponding one of the plurality of roller shades, further comprising switches or buttons for a driver of the vehicle to lower and raise one or more of the roller shades in the vehicle having a designated window number, and further comprising switches on the rear doors having windows which can be actuated by passengers to lower and raise the roller shades provided on the rear doors.

4. The system of claim 1, further comprising a plurality of housings wherein the respective roller shades, rollers, and motors are mounted in respective housings of the plurality of housings having elongated openings through which the respective roller shades are extended and retracted.

5. The system of claim 1 wherein the respective roller shades, rollers, and motors of each of the side windows are installed inside door panels of the vehicle, and further comprising respective rigid frames to which the motors are attached and channels which guide the respective roller shades to move up and down with the roller shades interior of the door windows.

6. The system of claim 1, wherein the vehicle further comprises a windshield roller shade, the windshield roller shade comprising bristles constructed from the same material as the windshield roller shade with an aperture at the top of the bristles to accommodate a rear view mirror mount attached to the windshield, and further comprising rails at right and left edges of the windshield to guide the windshield roller shade when lowered and raised.

7. The system of claim 1 wherein the roller shades are constructed with polyester or other ultraviolet (UV) resistant material and are white or another opaque color.

8. The system of claim 7 wherein surfaces of the roller shades are adapted to be embellished with advertising or decorated with art work.

9. The system of claim 1 wherein the roller shades are constructed with transparent infrared (IR) and ultraviolet (UV) blocking film laminated to an ultraviolet (UV) resistant substrate for added structural integrity.

10. The system of claim 1, further comprising an auxiliary air conditioning system connected via the thermostat to the vehicle battery and activated when the temperature inside the vehicle exceeds the predetermined temperature set by the thermostat.

11. The system of claim 4 wherein the vehicle has an interior having a color and the housings are mounted in an arched space below a ceiling and above the side windows of the vehicle and have an exterior finish which is the same color as the interior of the vehicle.

12. The system of claim 4 wherein the vehicle has an interior having a color, further comprising a plurality of slit covers wherein each of the slit covers is attached to a bottom portion of a respective one of the plurality of roller shades, wherein each of the slit covers has a weight to move the roller shade to which it is attached down by gravitational force and wherein a color of the slit covers is the same color as the interior color of the vehicle.

13. The system of claim 1 wherein the vehicle comprises doors having door pillars, wherein each door comprises one of the plurality of side windows and a corresponding one of the plurality of roller shades, the doors further comprising guides having opposed channels attached to the door pillars of each vehicle door having one of the side windows to guide a respective one of the plurality of roller shades so that each roller shade is positioned with respect to each respective side window.

14. The system of claim 1, further comprising an exhaust fan having a flap cover that opens when the exhaust fan is activated and closes when the exhaust fan is deactivated, wherein the exhaust fan is installed inside the vehicle and connected via a second thermostat set to a temperature greater than the predetermined temperature to the vehicle battery and activated to blow hot air out through a vent duct when the temperature inside the vehicle exceeds the setting of the second thermostat.

15. The system of claim 1, further comprising a solar panel connected to the vehicle battery to charge the vehicle battery.

16. The system of claim 1 wherein the rear window sunscreen is a photochromic sunscreen, and further comprising transparent electrical conductors embedded in the glass and connected via respective sensors to the vehicle battery to heat the glass to change from clear to dark or dark to clear automatically to counteract a dark state caused by cold weather, and further comprising an auxiliary air conditioning system activated automatically by a second thermostat connected to the vehicle battery.

17. The system of claim 1, further comprising a platform mounted to a driver side front door pillar inside the vehicle and a rail mounted inside the vehicle proximate to the platform, and wherein the first motor drive mechanism is attached to the platform and the first motor drive mechanism actuates the arm to rotate and ride on the rail to pivot and swing the arm to adjust the position of the driver side sun visor.

18. The system of claim 1, further comprising:
a front passenger side sun visor;
a second clip to attach the front passenger sun visor above the windshield of the vehicle;
a second arm attached to the front passenger sun visor;
a second motor drive mechanism mounted to the vehicle and connected to the second arm;
a second visor control comprising at least one of a) a second manual control which can be actuated by the front passenger to adjust a position of the front passenger sun visor and b) the GPS-powered digital compass control to adjust the position of the front passenger sun visor automatically based on the geographical position of the vehicle with respect to the position of the sun;
wherein the second visor control is connected between the second motor drive mechanism and the vehicle battery to activate the second motor drive mechanism to pivot the front passenger sun visor downward away from the second clip toward the windshield and pivot the front passenger sun visor downward and upward and swing the front passenger sun visor to a front passenger side window and back toward the windshield via the second arm attached to the front passenger sun visor and connected to the second motor drive mechanism to adjust the position of the front passenger sun visor to block the sun.

* * * * *